Aug. 23, 1966 P. C. V. BAILLOD 3,267,800

APPARATUS FOR THE SELECTION AND REPRODUCTION OF DOCUMENTS

Filed Sept. 9, 1963 5 Sheets-Sheet 1

Aug. 23, 1966 P. C. V. BAILLOD 3,267,800

APPARATUS FOR THE SELECTION AND REPRODUCTION OF DOCUMENTS

Filed Sept. 9, 1963 5 Sheets-Sheet 4

United States Patent Office 3,267,800

Patented August 23, 1966

3,267,800
APPARATUS FOR THE SELECTION AND REPRODUCTION OF DOCUMENTS

Philippe Charles Victor Baillod, Paris, France, assignor to The Centre d'Etudes et de Recherches pour la Documentation Automatique (C.E.R.D.A.), Paris, France, a French civil company Filed Sept. 9, 1963, Ser. No. 307,601
Claims priority, application France, Sept. 13, 1962, 909,395
9 Claims. (Cl. 88—24)

This invention relates to an apparatus for the selection and reproduction of documents. The invention is especially applicable to the selection and reproduction of a document from a series of documents recorded on a carrier, each document being accompanied on the carrier by a coded representation of several characteristics of the document.

The principal object of the present invention is to provide an improved apparatus whereby when a coded representation contains certain predetermined characteristics the corresponding document is automatically selected and reproduced.

A further object of the invention is to reduce wear on the carrier by keeping it in continuous motion during sensing of the coded representations and reproduction of selected documents.

According to the invention there is provided the selection and substantially simultaneous reproduction of a document from a series of documents recorded on a carrier, each document being accompanied on the carrier by a coded representation comprising a plurality of side by side elements representative of characteristics of the document, by passing the carrier continuously past a scanning device, successively comparing each element of the coded representation of a document on the carrier with each element of a coded representation pattern of the characteristics of the document to be reproduced, causing the scanning device to emit a signal impulse when the elements of a coded representation have been identified and matched in any order with the elements of the pattern and the document is in a position to be reproduced and reproducing the selected document without stopping the carrier in response to the control signal impulse.

Preferably the coded representation on the microfilm comprises an arrangement of opaque spots or fields arranged and distributed on a transparent background, and the coded pattern comprises an inverted diagram whereby during passage of a coded representation on the microfilm past the scanning device an inverted image of the coded representation is projected onto the pattern whereby passage of a matching element of the image over the diagram causes occultation of light from the corresponding element of the pattern.

The invention has therefore for an object an apparatus comprising a scanning device, means for continuously advancing the carrier past the scanning device, such scanning device being adapted to compare the elements of a coded representation with the elements of a coded pattern representative of the characteristics of a document to be selected and reproduced, means for producing a control impulse when the elements of a coded representation correspond, in any order, with the elements of the pattern, and means operable in response to such impulse for reproducing the document corresponding with the coded representation initiating the impulse.

The meaning of the term "document" is not restricted to a single image, but should be understood to cover the case where several images are placed in a series one after the other, a single coded representation being provided for the series of images.

The invention will be now described in further detail with reference to the accompanying drawings, showing a preferred embodiment and in which.

Figure 7:
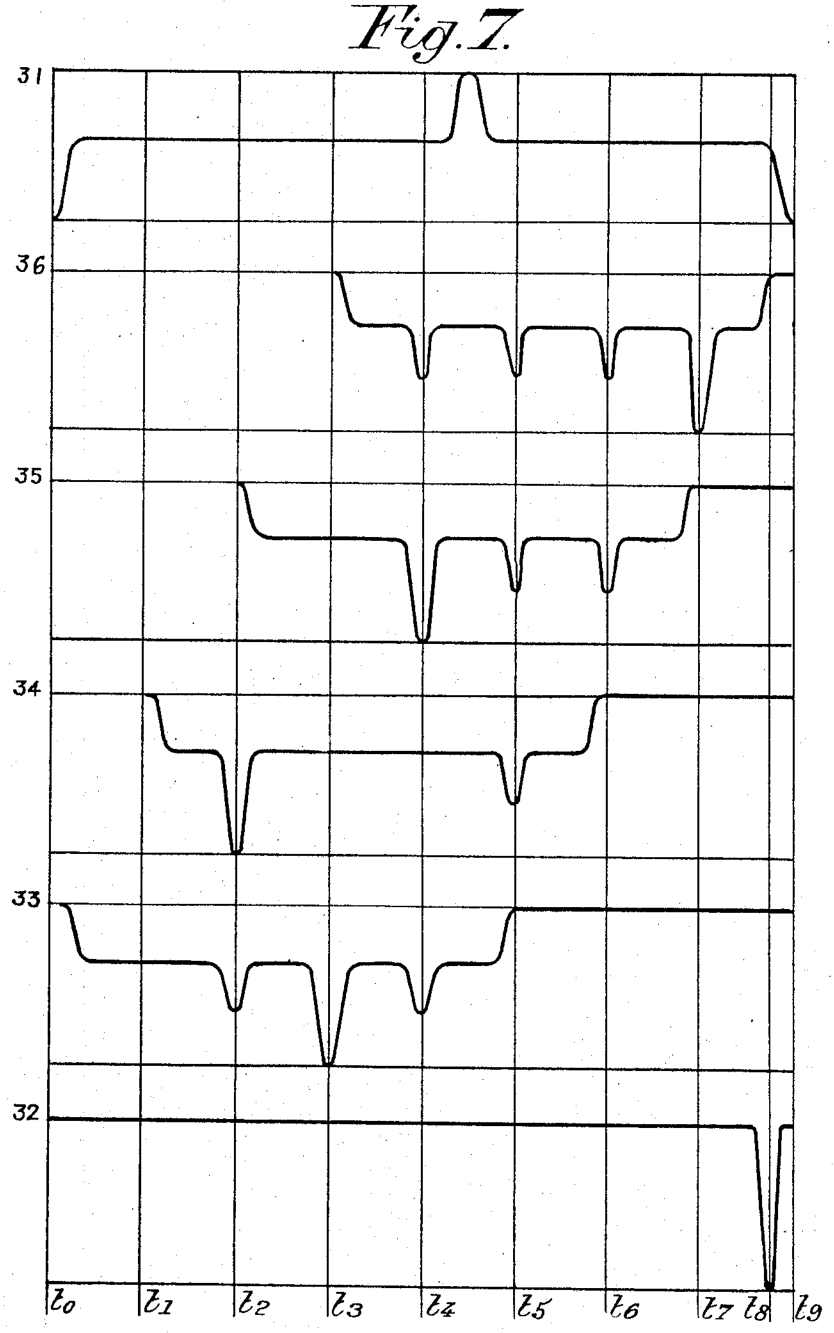
Figure 8:
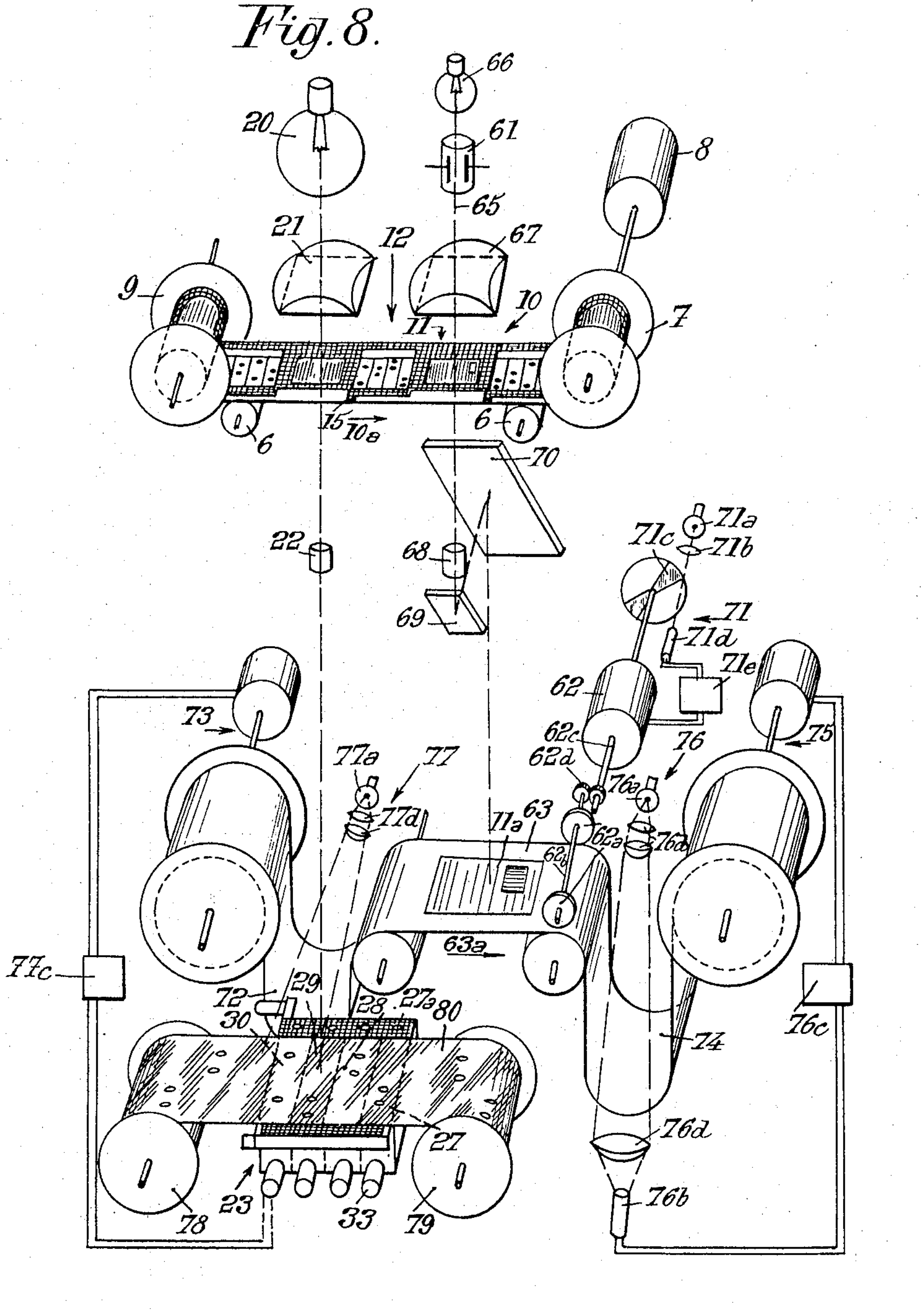

FIGURE 7 is a simplified diagram of the various impulses originated during the process of scanning a coded representation of four characteristics while comparing the coded representation with a model pattern; and FIGURE 8 is a diagrammatic perspective view of the whole arrangement according to the invention for comparing the coded representations as well as reproducing a document satisfying the conditions of identity of the coded representations of the characteristics.

The apparatus of the present invention will now be described with detailed reference to the drawings, on which the carrier is shown, according to a preferred embodiment, as a microfilm comprising pairs of adjacent images, one image of each pair comprising the document and the other image of the pair comprising a coded representation of certain characteristics or items of the document.

Figure 1:
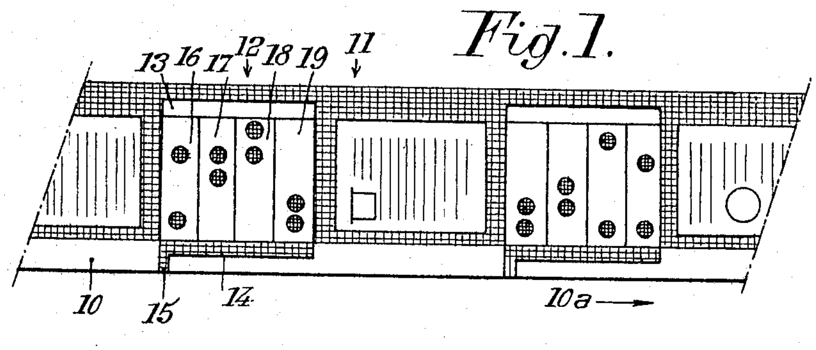
FIGURE 1 is a view from above of a section of a carrier of the conventional microfilm type, on which have been reproduced by photography alternate images of documents and the respective corresponding coded representations.

As shown by FIG. 1, a microfilm 10 of considerable length is moved continuously in the direction of the arrow 10*a*. On this microfilm there are provided successive pairs of images, each pair comprising an image of a document 11 and its corresponding coded representation 12. The microfilm, which may, or may not have marginal perforations, is guided by appropriated means (not shown) so as to be accurately positioned both in its plane of movement as well as in a direction perpendicular to its plane. This is to ensure maximum sharpness and as accurate a framing as possible of the enlarged images obtained from the microfilm as will be described hereafter. These technical conditions are evident requirements and do not need further explanation. Furthermore it is self-evident that the geometric centres of the images of the document 11 and its corresponding coded representation 12 must always be spaced at a constant distance which determines certain characteristics of the construction and setting of the scanning and reproduction devices later to be described.

The images of the coded representation 12 possess a certain number of common features. Each of these images of coded representations comprises a transparent border strip 13 parallel to and in proximity of the border of the microfilm and extending over the total length of the image, an opaque border strip 14 parallel to and in proximity of the other border of the microfilm and extending over the total length of the image, a short opaque field or spot 15 located at the end of the image of the coded representation 12 and extending from the opaque strip 14 towards the adjacent edge of the microfilm.

Furthermore, each image of a coded representation 12 possesses particular characteristics, i.e. the coded expression of the characteristics of document 11 linked with the image of this coded representation. In the embodiment shown, these particular characteristics of the image of the coded representation 12 are disposed along narrow strips 16, 17, 18 and 19 placed side by side, each strip extending perpendicularly to the centre line of the microfilm. This group of strips completely covers the image 12; the purpose of each strip is to represent a characteristic or item by means consisting for instance in the use of opaque spots (points sections or fields), and their disposition on a transparent background from which they stand out and on which they are arranged in a distinctive manner.

Figure 2:
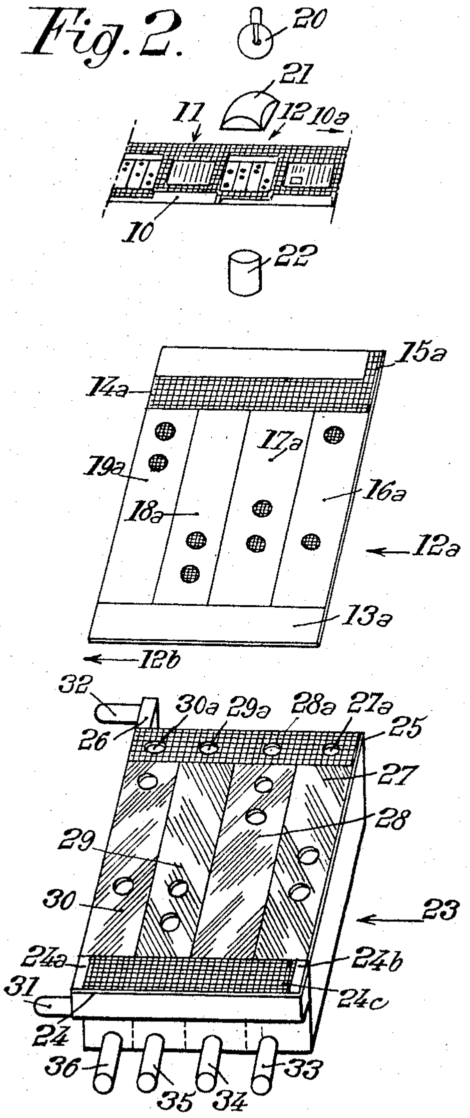
FIGURE 2 is an exploded diagrammatic perspective view of an installation for comparing the coded representation of a document with the coded representation of a model pattern when carrying out the method of the present invention.

As illustrated by FIG. 2, the apparatus for comparing the coded representation of a document with the coded representation of a model pattern comprises a constant light source 20, an optical condenser 21, a lens 22 producing in the conventional manner, an enlarged and reversed positive image 12*a* of the coded representation 12 on the microfilm 10 passing at the considered instant just through the optical device described. This image 12*a* which has been shown—in order to facilitate the understanding of the drawing—as being formed in space, is formed in reality on the upper face of selector 23 which will be described in detail hereafter, said image 12*a* moving in the direction of the arrow 12*b*.

The selector device 23 looks from the outside like a box, its interior being divided into as many compartments as the coded representation 12 comprises strips representing characteristics. The upper sides 27, 28, 29 and 30 of these compartments comprise plates into which have been punched openings according to the same code as that used already for the coded representation 12 on the microfilm 10.

The enlarged images 16*a*, 17*a*, 18*a* and 19*a* from the strips 16, 17, 18, 19 are projected on these plates so that the images of the opaque spots coincide with the punched openings when the coded characteristics of the image correspond with those of the model pattern formed by the plates. The selector device 23 has an additional compartment 24 perpendicular to the compartments covered by the plates, 27, 28, 29 and 30, this compartment 24 is so located as to receive the enlarged projection 13*a* of the border strip 13 of the coded image 12 on the microfilm, the strip 13 being transparent. The majority of the top side 24*c* of the compartment 24 is blacked out, leaving only two small transparent openings 24*a* and 24*b* at each end of the compartment. The selector 23 is fitted with a cover 25 located on the ends of the top side cover plates 27, 28, 29 and 30 opposite to the compartment 24 in such a way as to receive on its own top side, the enlarged image 14*a* of the opaque border strip 14 of the coded image 12 on the microfilm. This cover 25 has punched openings 27*a*, 28*a*, 29*a* and 30*a* communicating with the interior of the compartments covered by the top side plates 27, 28, 29 and 30. Finally the selector device 23 comprises a small compartment having an open top 26 so located as to receive the enlarged image 15*a* of the small opaque spot 15 on the microfilm 12.

Inside the compartments with the respective top sides 24, 26, 27, 28, 29 and 30 is mounted a light sensitive component, preferably comprising the photo-cathode of a photo-multiplier tube, the various photo-multiplier tubes 31, 32, 33, 34, 35 and 36 respectively corresponding to the various compartments.

The operation of the various devices and electric and electronic circuits allowing the identity of the characteristics of the coded representation linked to the document to be compared with the characteristics of the coded representation of the model pattern for the case of a model pattern comprising four characteristics as indicated by the plates 27, 28, 29 and 30, will now be described with reference to FIGS. 3 and 4, the passage of the image 12*a* over the top of the selector 23 being shown in FIG. 7 as separated into 10 instants *"t0"* to *"t9."*

Figure 3:
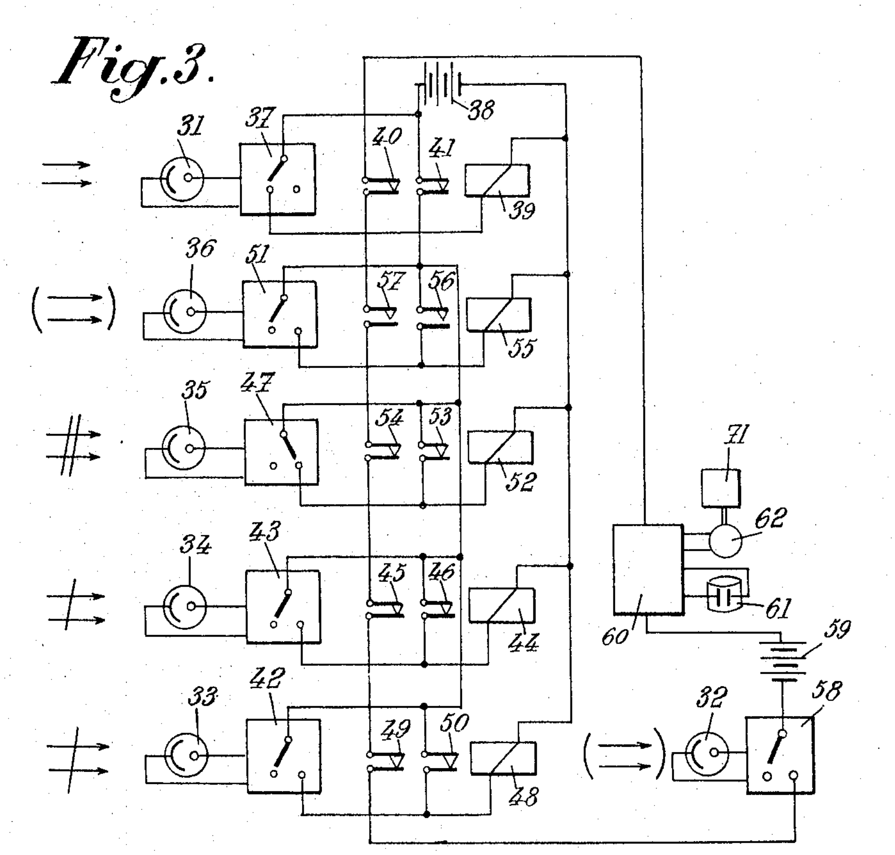
FIGURE 3 is a circuit diagram for the installation of FIGURE 2, such installation being adapted to select a coded representation having four characteristics.
Figure 4:
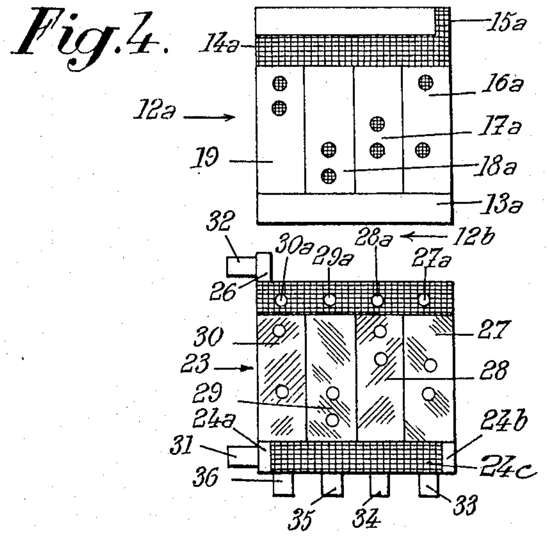
FIGURE 4 shows schematically the image of a coded representation of a group of four characteristics and the coded representation of the model pattern of these concepts, in the relative positions these representations occupy at the instant defining the state of the circuit diagram of FIGURE 3.

FIG. 4 shows the relative positions of the image 12*a* and the coded representation of the model pattern placed on the selector 23 at the time *"t4;"* FIG. 3 shows the circuits at the same instant *"t4."*

FIGURE 7 shows how the passage of the image on the selector lets light penetrate into the compartments of the selector or blacks them out, units have been chosen arbitrarily.

At time *"t0,"* the transparent strip 13*a* of the image 12*a* throws light on the window 24*b*. The photo-tube 31 receiving light, it closes switch 37 to complete circuit 38/39/37, energization of electronic relay 39 closing the contacts 40 and 41 for the duration of the passage of the image 12*a*.

At time *"t1,"* image 19*a* covers plate 27, the black strip 14*a* of the image 12*a* covers the opening 27*a* of the compartment of the selector 23 but the corresponding photo-tube 33 receives light from the top-side plate 27, the openings in the plate not being covered, consequently contact 42 remains open.

At time *"t2,"* image 19*a* covers plate 28, and image 18*a* covers plate 27; the compartment of selector 23 corresponding to photo-tube 34 does not receive any light, since the black strip 14*a* covers opening 28*a* and the two black spots 19*a* cover the two openings in the top-side 28. Photo-tube 34 being blacked out, switch 43 is closed and circuit 38/44/43/41 is completed, the contacts 45 and 46 thus being closed. The contact 46 has a self-locking action so that the contacts 45 and 46 remain closed after opening of switch 43.

At time *"t3,"* image 19*a* covers plate 29, image 18*a* covers plate 28, and image 17*a* covers plate 27.

The tubes 34 and 35 receive light so that switches 43 and 47 are open; as indicated above contact 45 remains closed due to the contact 46 maintaining a circuit through relay 44. The plate 27 is, however, completely blacked out so that the photo-tube 33 does not receive any light. This causes closing of switch 42 which completes circuit 38/48/42/41, the relay 48 closing control 49 and 50 which remain closed due to closure of contact 50 completing a circuit through relay 48 to give a self-locking action.

At time *"t4"* the diagrams of FIGS. 3 and 4 apply exactly to the conditions obtaining. In FIG. 3 the arrows have the following meanings:

| | |
|---|---|
| Double arrow | Photo-tube receiving light. |
| Double arrow between brackets | Photo-tube receiving light and to be blacked out later. |
| Double arrow crossed once | Photo-tube receiving light after having previously been blacked out. |
| Double arrow crossed twice | Photo-tube blacked out. |

At this time *"t4,"* image 19*a* covers plate 30, image 18*a* covers plate 29, image 17*a* covers plate 28 and image 16*a* covers plate 27. The plate 30 is not blacked out so that switch 51 remains open. The plate 29 is blacked out so that the photo-tube 35 closes switch 47 and completes the circuit 38/52/47/41 to close contacts 53 and 54 which remain closed due to the self-locking action of contact 53 on relay 52.

At time *"t5,"* image 18*a* covers plate 30, image 17*a* covers plate 29 and image 16*a* covers plate 28. Plate 30 is not blacked out so that photo-tube 36 continues to receive light and switch 51 remains open. Plates 29 and 28 are not blacked out so that the photo-tubes 35 and 34 receive light and switches 47 and 43 are open, the contacts 54 and 45 remaining closed due to the locking of the relays 52 and 44.

At time "*t*6" image 17*a* covers plate 30, and image 16*a* covers plate 29. Plate 30 is not blacked out so that photo-tube 36 receives light and switch 51 remains open. The contacts 45, 49 and 54 remain closed because of the locking action of the relays 44, 48 and 52.

At time "*t*7" image 16*a* covers plate 30 and plate 30 is completely blacked out, photo-tube 36 thus induces closing of switch 51 and completion of the circuit 38/55/51/41. The contacts 57 and 56 are thus closed and locked by the action of contact 56 completing a circuit through relay 52.

At time "*t*8" compartment 26 is blacked out by the black spot 15*a* of image 12*a*. The photo-tube 32 does not receive any light, this black-out resulting in the closure of switch 58 which completes the circuit 59/60/40/57/54/45/49/58. The current flowing through the control unit 60 induces the opening of an optical shutter 61 and originates the impulse which is necessary to operate a motor 62 as will be described in greater detail later with reference to FIG. 8.

At time "*t*9," the image 13*a* of strip 13 of the microfilm having passed the window 24*a*, the photo-tube 31 is blacked out and induces opening of switch 37 and of the circuit 38/37/39. The relay 39 thus releases the contacts 40 and 41, release of contact 41 cutting the electric current to relays 55, 52, 44 and 48 so that contacts 40, 41, 57, 56, 54, 53, 45, 46, 49 and 50 are all opened. At the same time, the photo-tube 32 no longer being blacked out, switch 58 opens so that the whole circuit is returned to its initial condition and the selector device 23 is ready to receive the projection of the next image of the film 10.

Summing up, therefore, it will be appreciated that the instant "*t*0" is the time at which the photo-tubes 33, 34, 35, 36 which compare the image with the model pattern are unlocked. Times "*t*1" to "*t*7" are the successive steps of the comparison of the characteristics of the image and the pattern, time "*t*8" is the instant at which the reproduction of a selected image of a document may take place, and time "*t*9" is the instant when the tubes 33, 34, 35, 36 are prepared to sense the next coded image.

Figure 5:
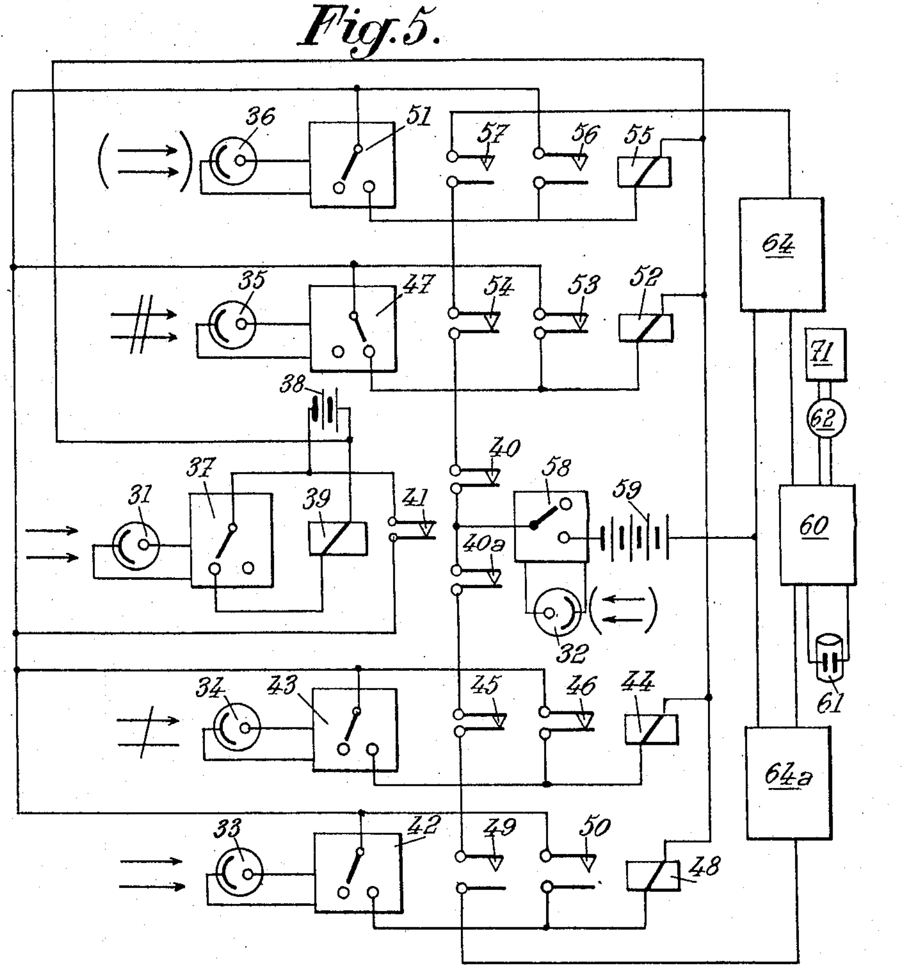
FIGURES 5 and 6 show in a similar manner to FIGURES 3 and 4, a circuit diagram and the relative position of the two coded representations, where the coded representation comprises, instead of a single group of four characteristics, two independent groups each comprising two characteristics.
Figure 6:
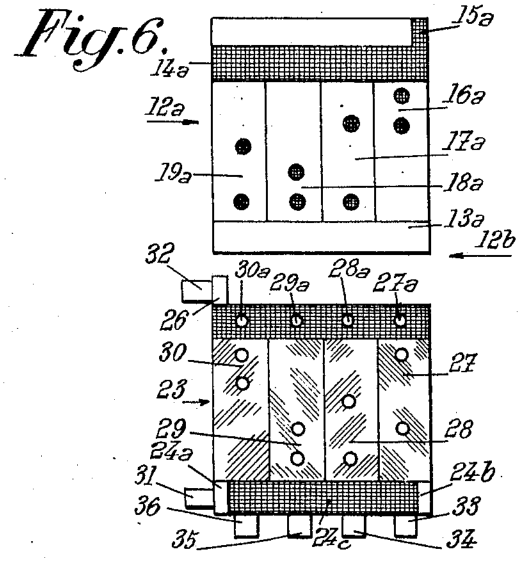

FIGS. 5 and 6 illustrate an arrangement in which the coded representations comprise two groups with two characteristics in each group, instead of the four separate characteristics of the arrangement described with reference to FIGS. 3 and 4. Thus referring to FIG. 6, the plates 27 and 28 indicate one group of characteristics and the plates 29 and 30 indicate another group of characteristics.

We will now describe the operations of this arrangement occurring at successive time intervals considering the coded representations shown in FIG. 6 where images 16*a*, 18*a* and 19*a* correspond with plates 30, 29 and 28 respectively, and where image 17*a* does not correspond with plate 27.

At time "*t*0," the tube 31 receives light from 24*b* and closes switch 37 to energize relay 39 which closes contacts 40, 40*a* and 41.

At time "*t*1" image 19*a* covers plate 27 but does not prevent light being received by photo-tube 33 so that switch 42 remains open.

At time "*t*2" image 19*a* covers plate 28 and image 18*a* covers plate 27. The photo-tube 34 is blacked out to close switch 43 and operate relay 44 which closes contacts 45 and 46, the closing of contact 46 serving to keep relay 44 energised and thus keep the contact 45 closed.

At time "*t*3" image 19*a* covers plate 29, image 18*a* covers plate 28, and image 17*a* covers plate 27. The photo-tubes 33, 34 and 35 all receive light so that switches 42, 43 and 47 are all open.

At time "*t*4" image 19*a* covers plate 30, image 18*a* covers plate 29, image 17*a* covers plate 28 and image 16*a* covers plate 27. The tube 36 receives light so that switch 51 is open. Tube 35 is blacked out so that switch 47 is closed and consequently relay 52 is energized to close contacts 54 and 53, contact 53 serving to lock relay 52 and maintain contact 54 closed. This is the condition illustrated in FIGURE 5, the double arrows directed at the photo-tubes having the same meanings as those described above in relation to FIG. 3.

At time "*t*5" image 18*a* covers plate 30, image 17*a* covers plate 29 and image 16*a* covers plate 28. Photo-tubes 36, 35 and 34 all receive light so that switches 51, 47 and 43 are all open.

At time "*t*6" image 17*a* covers plate 30 and image 16*a* covers plate 29. Photo-tubes 36 and 35 both receive light so that switches 51 and 47 are both open.

At time "*t*7" image 16*a* covers plate 30. Photo-tube 36 is blacked out so that switch 51 is closed with relay 55 closing contacts 57 and 56; as before contact 56 serving to maintain current to relay 55 and thus keep contact 57 closed.

At time "*t*8" the spot 15*a* covers compartment 26 to black out photo-tube 32 which, in turn, causes switch 58 to be closed. Closure of switch 58 completes circuit 59/58/40/54/57/64 which causes servo-control unit 64 to transmit to control unit 60 the impulse signal needed to operate shutter 61 and motor 62. Closure of the switch 58 does not, however, complete a circuit through the second servo-control unit 64*a* as plate 27 has not been matched with an element of the image, and thus switch 42 has not been actuated by blacking out of photo-tube 33 to cause closure of contact 49. It will be appreciated that with the arrangement of FIG. 5 the servo-control units 64 and 64*a* can be so related to control unit 60 that an operator, by a suitable adjustment, can cause a document to be reproduced either only when all four plate elements 27, 28, 29, and 30 of the pattern are matched or if only one pair of plate elements, plates 27 and 28 or 29 and 30 are matched.

At time "*t*9" photo-tube 31 is blacked out so that switch 37 is opened to de-energize relay 39 and thus open contacts 37, 41, 40 and 40*a*. This causes relays 44, 52 and 55 all to be de-energized so that the circuit returns to its initial condition ready to sense the image of coded representation of the next document on the microfilm.

The following description illustrated by FIG. 8 explains the registering of a selected document on a "secondary memory," after the comparison of coded characteristics carried out as described above had revealed that the document contained the required characteristics.

FIG. 8 shows the microfilm 10 at the very instant when, after the scanning of the coded representation 12, the geometrical centre of the document 11 corresponding to the scanned coded representation coincides with the optical axis 65 of the reproduction device.

The required coincidence with the optical axis is accomplished during construction of the equipment, taking into account the fact that the distance measured on the longitudinal axis of the microfilm between the geometrical centre of the document 11 and the centreline (perpendicular to the longitudinal axis) of the black spot 15 of the coded representation 12 of the corresponding document is constant and has been properly defined during the recording of the microfilm. Under these circumstances, the reproduction of a document can only be carried out after the scanning of the coded representation has been completely finished. In FIG. 8 there is shown a winding-up device 7, driven by a motor 8, and an unwinding device 9, as well as support and guiding rollers 6.

The following items are located on this optical axis 65 of the reproduction device: a light source 66 which operates in conjunction with shutter 61 under the control of control unit 60 in order to release a short flash of light onto the image 11 in response to a signal obtained from the circuit illustrated in FIGS. 3 or 5, an optical condenser 67, a lens 68, a first mirror 69 and a second mirror 70, the mirrors being inclined to appropriate angles. This installation is designed to project on the carrier 63 which, in the present case, comprises the secondary memory, a positive, enlarged, and reversed image 11*a* from the document 11 on the microfilm 10.

In the example shown and described, the memory 63 can advantageously be formed by a photographic support, web, strip or carrier covered by an emulsion highly sensitive to the image produced by the light supplied by the light source 66.

The impulse controlling, by the control unit 60, the short illumination of the document 11 on the microfilm 10, simultaneously controls the operation of the motor 62. An electrical and optical device 71 limits the movement of the motor to a predetermined angle of rotation. The device 71 comprises a source 71*a* of constant illumination, a lens 71*b*, a shutter 71*c* (which may advantageously comprise a Kerr cell controlled by the previously mentioned control impulse to allow brief passage of light or to prevent the passage of light), suitable for preventing light from the source 71*a* from falling on a photoelectric cell or photo-multiplier tube 71*d* which controls the system 71*e* for driving the motor 62. The rotation of the shaft 62*c* of the motor 62 causes the movement of the photographic support 63 in direction of arrow 63*a*, over a distance slightly exceeding the length of one image 11*a*. This mechanical movement is accomplished by conventional means through a system of pressure rolls 62*a* carried by a shaft 62*b* rotatably driven by the shaft 62*c* by pinions 62*d*. In order to limit the inertia of the photographic support strip to its minimum value, loops are provided before and after the planar portion receiving the projection of image 11*a*, i.e. before this portion the feeding roll pays out a loop 72 through an unrolling device 73, and after the planar portion the support builds up a loop 74 before final rewinding by a rewinding device 75. The dipping depth of the sagging loops is maintained within certain safety limits through the control of electrical-optical devices 76 and 77 having individual light sources 76*a*, 77*a* emitting light to which the photographic support 63 is insensitive, such light being received, after passing lenses 76*d*, 77*d*, by photoelectric cells, such as cell 76*b*, which control the servo-mechanisms 76*c* and 77*c* controlling the devices 75 and 73 respectively.

After the scanning of all the documents likely to contain a certain given group of characteristics has been completed, the coded representation of the model pattern which has been so far used on the selector 23 can be replaced by a new coded representation corresponding to a new set of characteristics in order to proceed with a new operational sequence of the search for and the reproduction of documents.

Means for charging the pattern representation is shown in FIG. 8 as comprising an unrolling device 78 and a rewinding device 79, allowing the intermittent transport of a ribbon 80 on which have been established the various coded representations of model patterns corresponding to the programme of selection work assigned to the installation. Transport of the web can be accomplished by hand or, for instance, can be controlled by a special spot or field on the microfilm 10 or by a special servo-device (not shown). The operation of such a servo-device can be controlled by such a field or spot located between two pairs of coded documents; this field may comprise openings or interruptions or indentations for the purpose of releasing or originating an appropriate control impulse or signal.

In order to avoid mixing documents registered on the secondary memory, it may be convenient to provide a marking device or identification device such as a numbering device. Such a numbering device (not shown) may be controlled automatically at each change of the model pattern of the coded representation to print a reference number or mark on top of the first document of a series of documents corresponding to the given group of characteristics.

When during the recording on the microfilm 10 each pair does not comprise the image of a document 11 and the image of its corresponding coded representation 12, but a succession (not shown) of images of documents $11_1$, $11_2$, $11_3$ . . . $11_n$ and a single image of the coded representation 12 corresponding to this series, it may be desirable to reproduce on the secondary memory all the "*n*" images of documents of the series. Such a series may, for instance, comprise the various "*n*" pages of a magazine article or a patent specification. For this purpose, it is possible to provide distributed over the length of the microfilm as many suitably spaced opaque spots 15 as there are documents to be reproduced in the series, in order to release through the control unit 60 the required number of control impulses.

The invention should not be restricted to the embodiments described above. On the contrary, it should be construed as covering all modifications within the scope of the clams, specially the modification in which the document recorded on the primary memory is not a photographic image understandable or readable on sight (reproduction of a page of printed text, of a map, a drawing, a plan) but a sound track either of constant or of variable intensity. In this latter case, the secondary memory could be constituted by a photographic film on which another sound track considered satisfactory has been reproduced identically with itself, or it could be formed by a magnetic tape on which the modulations of the sound track are recorded by conventional means.

According to another modification, in certain cases it may be desirable to replace the constant intensity light source 66 and the shutter 61 by an electronic discharge device emitting a short and luminous flash of sufficient intensity, released through the passage of an impulse from the control unit 60. As a further alternative the electrically controlled shutter 61 can be in the form of a "Kerr" cell.

I claim:

1. Apparatus for selecting, among a succession of documents recorded along a longitudinal photographic carrier, each particular document being accompanied by an adjacent coded representation, in a predetermined code based on areas of different opacities, of a given number of elementary characteristic items covered by said particular document, said coded representation comprising a plurality of bands of a substantially equal breadth located transversally to said carrier, the number of said bands in said plurality being equal to said number of items, any document covering at least one series of searched for elementary characteristic items, the total number of items in said series being at the most equal to said number of items in said plurality, said at least one series being embodied in a coded pattern including several parallel rows of substantially equal breadth, the number of said rows being equal to the total number of items in said at least one series, each of said rows embodying a representation of one searched for elementary characteristic item in a code based on areas of different opacities and corresponding to said predetermined code, and the disposition and dimension of the coded areas on said rows and said bands for a same item being related by a transformation of similarity, and for reproducing any selected document, comprising, in combination, a frame including a transparent window adapted to receive said coded pattern, and, behind said window, several photoelectric transducers, at least one transducer being located behind each row of said pattern located on said window, an optical projection system for projecting, on said coded pattern located on said frame, the real optical image of a given zone, means for continuously longitudinally advancing said carrier through said zone, thereby successively passing therethrough all bands of each coded representation thereof and successively projecting the images of all said bands on each of the rows of said pattern located on said window, means for delivering a control signal in response to the correspondence of all coded rows of said pattern corresponding to at least one series of searched for items and of images of said coded bands of a coded representation accompanying one document, and means operating, during the continuous advancing of said carrier, the reproduction of said one document in response to said control signal.

2. Apparatus according to claim 1, wherein said carrier is constituted by a microfilm, said documents and the accompanying representations thereof being recorded as successive photographic pairs.

3. Apparatus for selecting, among a succession of documents recorded along a longitudinal photographic carrier, each particular document being accompanied by an adjacent coded representation, in a predetermined code based on areas of different opacities, of a given number of elementary characteristic items covered by said particular document, said coded representation comprising a plurality of bands of a substantially equal breadth located transversally to said carrier, the number of said bands in said plurality being equal to said number of items, any document covering at least one series of searched for elementary characteristic items, the total number of items in said series being at the most equal to said number of items in said plurality, said at least one series being embodied in a coded pattern including several parallel rows of substantially equal breadth, the number of said rows being equal to the total number of items in said at least one series, each of said rows embodying a representation of one searched for elementary characteristic item in a code based on areas of different opacities and optically complementary to said predetermined code, and the disposition and dimension of the coded areas on said rows and said bands for a same item being related by a transformation of similarity, and for reproducing any selected document, comprising, in combination, a frame including a transparent window adapted to receive said coded pattern, and, behind said window, a multiplicity of parallely located elongated photoelectric transducers, one transducer being located behind each row of said pattern located on said window, an optical projection system for projecting, on said coded pattern located on said frame, the real optical image of a given zone, means for continuously longitudinally advancing said carrier through said zone, thereby successively passing therethrough all bands of each coded representation thereof and successively projecting the images of all said bands on each of the rows of said pattern located on said window, means for delivering a control signal in response to the complete coincidence of complementary areas of all rows of said pattern corresponding to at least one series of searched for items and of an equal number of images of bands of a coded representation accompanying one document, and therefore of the adsence of excitation of the photoelectric transducers placed behind all said rows, during the passage period of a single coded representation in said zone, and means operating, during the continuous advancing of said carrier, the reproduction of said one document in response to said control signal.

4. Apparatus according to claim 3, wherein each of said photoelectric transducers is constituted by a photocathode of a photomultiplier tube.

5. Apparatus according to claim 3, wherein said means operating the reproduction of said one document comprise a device, triggered by said control signal, for illuminating a second zone located odjacent to said flat zone, the relative positions of said flat zone and of said second zone being identical to the relative positions of any particular document and of the accompanying coded representation thereof on said carrier, a stationary light-sensitive paper, and a second optical projecting system for projecting on said paper the real optical image of said second zone occupied by said one document.

6. Apparatus according to claim 3, wherein said means for delivering a control signal comprise:

a first and a second further photoelectric transducers carried by said frame, said coded representation accompanying each document further comprising a pair of identification areas, said pair being identical for all representations, and said areas being positioned in each representation and said further photoelectric transducers in said frame in locations providing that, during the continuous advancing of said carrier, the image through said projection system of one of said areas in said pair acts on said first further transducer substantially as long as a representation is occupying at least a portion of said flat zone, whereas the image through said projection system of the other of said areas in said pair acts on said second further transducer when a representation is leaving said flat zone, a plurality of relays, one relay of said plurality being associated to each of said photoelectric transducers and to each of said further photoelectric transducers, a relay associated to a photoelectric transducer being energized when a coincidence of areas in a band of the carrier and in a corresponding row of said pattern or on said frame is detected by the associated transducer, whereas a relay associated to a further photoelectric transducer is energized when the associated further transducer is acted upon;

a plurality of holding circuits, a holding circuit in said plurality being associated to each of said photoelectric transducers and to said first further transducer, each holding circuit maintaining energized the associated relay as long as said first further transducer is acted upon;

an electric circuit adapted to start, when completely closed, said control pulse;

and a plurality of circuit-breakers located along said circuits, each circuit-breaker being associated to one of said relays and being in its closed position if and only if said associated relay is energized.

7. Apparatus according to claim 3, wherein said coded pattern is constituted by a portion of a microfilm comprising a succession of different patterns with a given step, said apparatus further comprising means for performing the advancement of said microfilm of one step corresponding to the step of said pattern on said microfilm.

8. Apparatus for selecting, among a succession of documents recorded along a longitudinal photographic carrier, each particular document being accompanied by an adjacent coded representation, in a predetermined code based on areas of different opacities, of a given number of elementary characteristic items covered by said particular document, said coded representation comprising a plurality of bands of a substantially equal breadth located transversally to said carrier, the number of said bands in said plurality being equal to said number of items, any document covering one series of searched for elementary characteristic items, the number of items in said series being at the most equal to said number of items in said plurality, said one series being embodied in a coded pattern including several parallel rows of substantially equal breadth, the number of said rows being equal to the number of items in said one series, each of said rows embodying a representation of one searched for elementary characteristic item in a code based on areas of different opacities and corresponding to said predetermined code, and the disposition and dimension of the coded areas on said rows and said bands for a same item being related by a transformation of similarity, and for reproducing any selected document, comprising, in combination, a frame including a transparent window adapted to receive said coded pattern, and, behind said window, several photoelectric transducers, at least one transducer being located behind each row of said pattern located on said window, an optical projection system for projecting, on said coded pattern located on said frame, the real optical image of a given zone, means for continuously longitudinally advancing said carrier through said zone, thereby successively passing therethrough all bands of each coded representation thereof and successively projecting the images of all said bands on each of the rows of said pattern located on said window, means for delivering a control signal in response to the correspondence of all coded rows of said pattern and of images of said coded bands of a coded representation accompanying one document, and means operating, during the continuous advancing of said carrier, the reproduction of said one document in response to said control signal.

9. Apparatus for selecting, among a succession of documents recorded along a longitudinal photographic carrier, each particular document being accompanied by an adjacent coded representation, in a predetermined code based on areas of different opacities, of a given number of elementary characteristic items covered by said particular document, said coded representation comprising a plurality of bands of a substantially equal breadth located transversally to said carrier, the number of said bands in said plurality being equal to said number of items, any document covering two series of searched for elementary characteristic items, the total number of items in said two series being at the most equal to said number of items in said plurality, said two series being embodied in a coded pattern including several parallel rows of substantially equal breadth, the number of said rows being equal to the total number of items in said two series, each of said rows embodying a representation of one searched for elementary characteristic item in a code based on areas of different opacities and corresponding to said predetermined code, and the disposition and dimension of the coded areas on said rows and said bands for a same item being related by a transformation of similarity, and for reproducing any selected document, comprising in combination, a frame including a transparent window adapted to receive said coded pattern, and, behind said window, several photoelectric transducers, at least one transducer being located behind each row of said pattern located on said window, an optical projection system for projecting, on said coded pattern located on said frame, the real optical image of a given zone, means for continuously longitudinally advancing said carrier through said zone, thereby successively passing therethrough all bands of each coded representation thereof and successively projecting the images of all said bands on each of the rows of said pattern located on said window, means for delivering a control signal in response to the correspondence of all coded rows of said pattern corresponding to at least one of said two series of searched for items and of images of said coded bands of a coded representation accompanying one document, and means operating, during the continuous advancing of said carrier, the reproduction of said one document in response to said control signal.

References Cited by the Examiner

UNITED STATES PATENTS

| | | | |
|---|---|---|---|
| 2,209,342 | 7/1940 | Loughridge et al. | 88—24 |
| 2,580,270 | 12/1951 | Badgley et al. | 88—24 |
| 2,594,358 | 4/1952 | Shaw | 88—24 |

NORTON ANSHER, *Primary Examiner.*

R. A. WINTERCORN, *Assistant Examiner.*